United States Patent Office 2,729,616
Patented Jan. 3, 1956

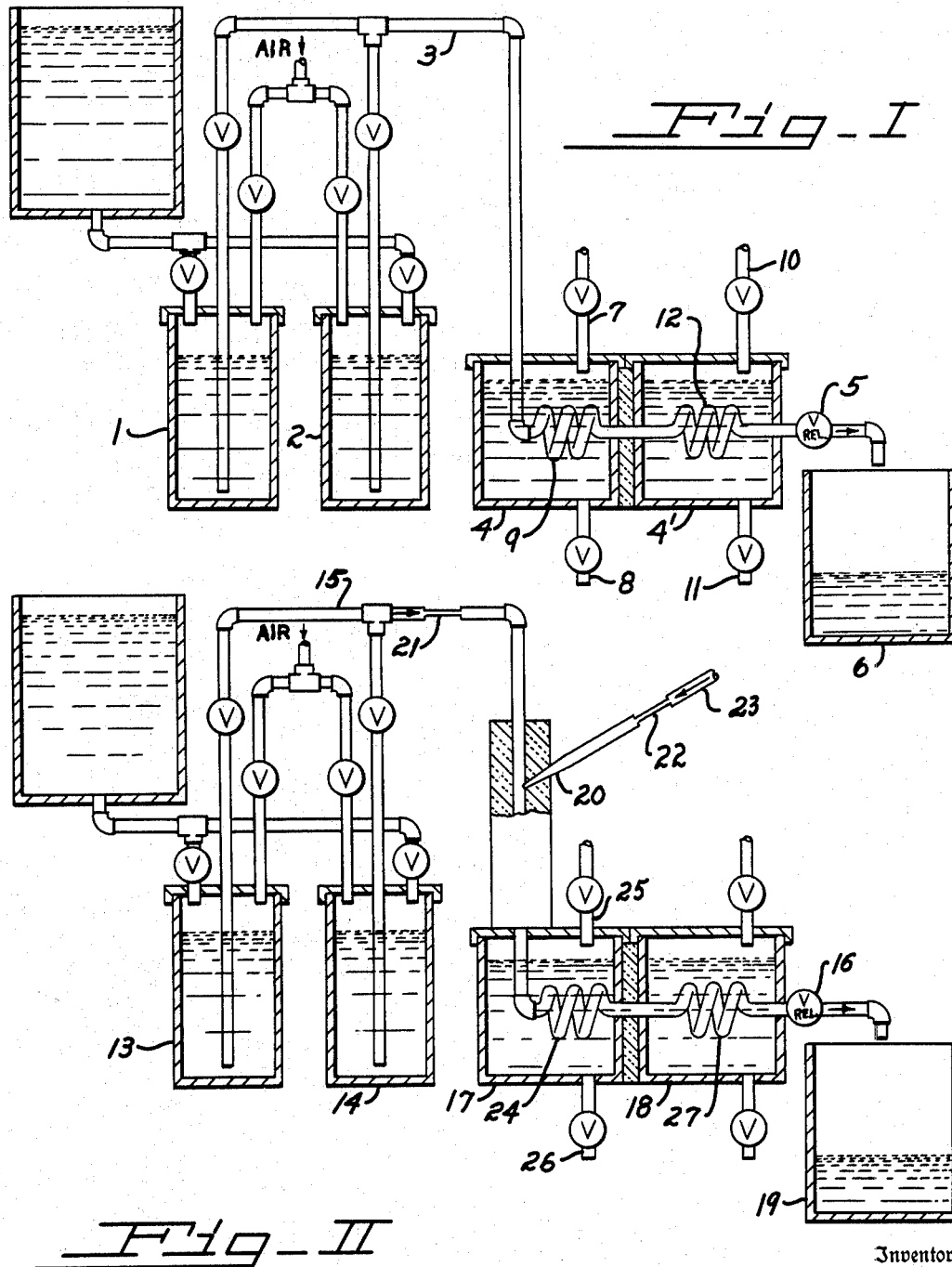

2,729,616

CONDENSATION OF UREA AND FORMALDEHYDE

Maurice H. Bigelow and Harold N. Spurlock, Toledo, Ohio, assignors, by mesne assignments, to Allied Chemical & Dye Corporation, New York, N. Y., a corporation of New York Application February 28, 1952, Serial No. 273,908

5 Claims. (Cl. 260—69)

The invention relates to an improved method of producing a urea-formaldehyde condensation product in which the condensation is carried out under superatmospheric pressure.

Heretofore, the condensation reaction of urea and formaldehyde in aqueous solution has been carried out at the boiling point of the solution by acidifying the solution to initiate the reaction and later neutralizing the solution to arrest the reaction. The use of superatmospheric pressure to increase the speed of the condensation reaction between urea and formaldehyde is of great potential value for increasing production rates, but carrying out such a condensation reaction under superatmospheric pressure presents difficult problems of control.

The principal object of the invention is to provide a novel method of controlling the condensation of urea and formaldehyde in aqueous solution under superatmospheric pressure. More specific objects and advantages are apparent from the description, in which reference is had to the accompanying drawings illustrating perferred apparatus for practicing the invention.

In the drawings:

Figure I is a diagram illustrating the process units and their relationship in carrying out the invention.

Figure II is a diagram illustrating a modification of the process units shown in Figure I and their relationship in carrying out the preferred species of the invention.

These specific drawings and the specific description that follows merely disclose and illustrate and are not intended to limit the invention.

When the condensation of urea and formaldehyde in aqueous solution is carried out under superatmospheric pressure, the customary operation of acidifying the solution to initiate the reaction becomes quite difficult. It would be desirable to measure the pH of the solution immediately after the solution reaches the reaction temperature under superatmospheric pressure. However, the condensation reaction is very rapid under these conditions, and it may be necessary to heat the solution rapidly after the superatmospheric pressure is applied and then to cool the solution rapidly as soon as the maximum temperature is reached.

In the novel method of the present invention, the solution is not acidified to initiate the reaction. The present invention is based upon the discovery that excellent results can be obtained by condensation of urea and formaldehyde in aqueous solution under superatmospheric pressure, with excellent control, if the pH of the solution is adjusted substantially to neutrality before the reaction begins. Thus, the present method, instead of relying upon measurement of the pH at the reaction temperature and pressure, relies upon a much more reliable and convenient pH measurement made before the start of the reaction.

It has been discovered that if the solution is substantially neutral prior to the start of the reaction, a drop in pH occurs during the subsequent reaction under superatmospheric pressure at a temperature above the boiling point.

Thus, in the present method the temperature and time of the reaction are adjusted to accommodate the reaction pH that is reached starting from a predetermined pH approximating neutrality, in contrast with prior methods in which the actual pH during the reaction was measured and controlled.

The present method of starting with a pH between 6 and 8 before commencement of the reaction has the further advantage that the starting solution is stable at temperatures up to the boiling point. The stability of the solution prior to application of superatmospheric pressure is important in the present process because it permits the solution to be held in storage tanks from which it is pumped into a continuous high pressure reactor without danger of precipitation and without danger that the product discharged from the continuous reaction will vary in its properties because of variation in the holding time of various parts of the solution prior to reaction.

The formaldehyde employed in the production of a ureaformaldehyde condensation product in accordance with the method of the invention may be in the form of one of its polymers such as paraformaldehyde or may be used in any combination with one of its polymers. Ordinarily, the water that is brought together with urea and formadlehyde to form an aqueous solution in the practice of the invention consists of the water present in an aqueous formaldehyde solution. Although the formaldehyde used may be ordinary commercial formalin (i. e., an aqueous solution comprising approximately 37 per cent formaldehyde by weight), it is preferred that the concentration of formaldehyde in the aqueous solution used be about 45 or 50 per cent. The stability of resins reacted at higher solids concentrations (i. e., resins in which the formaldehyde used is in a concentration of 45 or 50 per cent in aqueous solution) can be increased by dilution of the resin after preparation. Not more than about 2.5 mols of fomaldehyde should be used per mol of urea and it is preferable to use not more than about 2.2 mols per mol of urea. Not less than about 1.5 mols of formaldehyde should be used per mol of urea and it is preferable to use not less than about 1.8 mols per mol of urea. It is most desirable to use about 2.0 mols of formaldehyde per mol of urea.

Before heating the aqueous urea-formaldehyde solution under superatmospheric pressure, the pH of the solution should be adjusted to substantial neutrality, i. e., to within the range between 6.0 and 8.0. Preferably, the initial pH is between 6.5 and 7.5 and most desirably it is 7.0. During the subsequent condensation under the reaction conditions hereinafter described the pH drops to a value on the acid side at which condensation proceeds. (For example, when the initial pH is approximately 7.0, the pH drops to about 5.0 during the condensation under superatmospheric pressure at a temperature above the boiling point.) If desired, a buffer may be incorporated in the reaction mixture to prevent the pH from dropping so low that the reaction proceeds too rapidly for safe control. The more common buffers such as sodium carbonate, sodium bicarbonate, sodium acetate, sodium citrate, sodium phosphate, etc., are preferred from the standpoint of economy.

The condensation of urea and formaldehyde in accordance with the present method may be conducted as a batch process or as a continuous operation, the continuous process being the preferred embodiment of the invention. In any event, the considerations that govern the operating temperature ranges, proportions of ingredients and the pressure are the same for the present process conducted either as a batch process or as a continuous operation.

When the present process is conducted as a continuous operation, the neutralized aqueous urea-formaldehyde solution is conducted into a reaction zone under superatmospheric pressure and when the desired degree of condensation is achieved, the product is removed from the reaction zone.

For example, this process is conveniently carried out by the use of apparatus illustrated in Figure I. The reaction mixture is delivered from storage tanks to the blow cases 1 and 2. The blow cases can be used alternately, one being filled while the other is in operation, to provide a continuous source of supply of the reaction mixture. The mixture is forced from the blow cases by air pressure into a copper tube 3 at a pressure which is kept high enough to prevent vaporizing of the ingredients in the system and which depends upon the temperature of a reactor unit 4. The blow cases are kept under excess pressure; the pressure being regulated in the system by a spring loaded valve 5 which provides a constant pressure drop. A rapid and continuous flow of the mixture is maintained through the reactor unit 4 and a cooling unit 4', the condensation product being collected in a container 6.

The reactor unit 4 is heated by circulating a temperature changing medium through the reactor, which has a controllable inlet 7 at one end and a controllable outlet 8 at the other end. The temperature changing medium is preferably steam, although other suitable fluid may be employed. The reactor may be kept at a temperature between 100° C. and 200° C. Preferably the temperature is between 125° C. and 150° C. The temperature changing medium circulates about a reactor coil 9 which is long enough to allow the reaction mixture to remain at the preselected temperature for a suitable length of time to permit the desired degree of condensation (as hereinafter described) to be reached. The reaction progresses at a relatively rapid rate in the reactor and must be stopped or slowed down to such an extent that little further reaction takes place after the desired degree of condensation is reached.

To control the condensation endpoint, a cooling unit 4' is provided having an inlet pipe 10 and an outlet pipe 11. Water circulating through the unit keeps a cooling coil 12 relatively cold to arrest the reaction of the condensation product flowing through the coil. The condensation product is collected at room temperature and pressure in the container 6 and is neutralized to insure storage stability. By the proper selection of heating and cooling units having the correct relative volumes and by the proper adjustment of temperature, a continuous high speed production of a uniform urea-formaldehyde condensation product may be obtained. As hereinbefore mentioned, the condensation of urea and formaldehyde may also be conducted as a batch process. For example, the neutralized aqueous urea-formaldehyde solution may be charged to a bomb and the condensation carried out under the conditions of temperature and pressure hereinbefore described, the bomb being rapidly cooled and the contents removed as soon as the desired degree of condensation is achieved. However, accuracy of control is more difficult to achieve with a batch process and the continuous process is preferred as the more efficient method.

The apparatus which has been described needs cleaning from time to time to remove a slight build-up of insoluble or infusible resin in the heating coil 9. Even in turbulent flow there is at the boundary near the hot wall of the heating coil a residual film which persists from viscous flow. The apparatus can be varied to eliminate this build-up of infusible resin by forming the heating coil 9 into a straight tube with, of course, a corresponding lengthening of the reactor unit. The diameter of the tube may be enlarged to keep the length of the straight tube within practical limits. A motor-driven rotor carrying scraping blades may be installed to remove any film forming on the heat transfer wall.

Another way of eliminating the formation of a film on the wall of the heating coil is by installing a steam injector and certain metering and control equipment in the apparatus hereinbefore described. This modified apparatus is illustrated in Figure II. The process carried out by the use of this modified apparatus is the preferred species of the continuous process.

In carrying out the process by the use of the apparatus illustrated in Figure II, the reaction mixture is forced from the alternately operated blow cases 13 and 14 into a copper tube 15 at a pressure which is regulated by a spring loaded valve 16, and the condensation product is collected in a container 19.

The reaction mixture is heated by steam which is injected into the tube 15 by means of a steam injector 20. A restriction 21 in the tube 15 and a restriction 22 in the steam line 23 cause pressure drops across the respective restrictions so that means can be installed to meter the flow of reaction mixture and the flow of steam. Thus the proper ratio of reaction mixture to steam can be maintained. The steam can be taken from a line having for example 90 pounds per square inch pressure (gauge). Saturated steam at that pressure, if metered in a ratio of about 1 part of steam (by weight) to 4 parts of reaction mixture, will raise the temperature of the reaction mixture to the preferred range (125° C. to 150° C.). Furthermore, such a quantity of steam will add a suitable amount of water to the reaction mixture to produce a final condensation product which has about a 50 per cent by weight total water content.

The reactor coil 24 is maintained at a somewhat lower temperature than the steam heated reaction mixture by circulating a temperature changing medium through a reactor unit 17, which has a controllable inlet 25 at one end and a controllable outlet 26 at the other end. Thus the mixture flowing through the coil 24 is kept at a high temperature to allow the reaction to proceed, but because the temperature changing medium is at a lower temperature than the reaction mixture the inside wall of the copper coil 24 will be relatively cool. The comparatively cool inside wall of the coil insures a flow of reaction mixture through the coil uninterrupted by highly condensed films forming on the wall.

To control the condensation endpoint a cooling unit 18 and a cooling coil 27 are provided which operate in the same manner as the identical equipment previously described and illustrated in Figure I.

The steam injector species of the continuous flow process is the preferred embodiment of the invention because, by the proper selection of reactor and cooling units having the correct relative volumes and by the proper adjustment of the temperature and the reaction mixture-steam ratio, continuous high speed production of a uniform urea-formaldehyde condensation product can be obtained, with no shut downs of equipment for cleaning insoluble and infusible resin from the reaction coil.

The condensation of urea and formaldehyde in accordance with the present method may be carried out to produce a product that is useful in the production of glues. For example, the viscosity of the final condensation product may range from "B" to "G"–"H" (as measured by the standard Gardner-Holdt bubble viscometer method). That is, the cloud temperature of an aqueous urea-formaldehyde resin solution in which the concentration of the resin is approximately 50 per cent may be from about 0° C. to about 35° C. ("Cloud temperature" is that temperature above which a one phase water solution exists at a given concentration of resin.)

*Example*

Urea (1000 grams) is mixed with a solution (2000 grams) consisting of 51 per cent of formaldehyde and 49 per cent of water (by weight). The pH of the mixture is adjusted to 7.0 before charging it into a blow case. The blow case is connected to a coil that is heated in an oil bath at a temperature of 135° C. This section of the coil continues into a second section of coil which is cooled in a water bath. A valve at the end of the cooled section of coil opens into a receiver. The neutralized urea-formaldehyde solution is blown under 95 pounds of air pressure through the heated and cooled sections of coil, the valve at the end of the cooled coil being opened when the flow of the urea-formaldehyde solution starts, to permit dropwise flow of the condensation product into the receiver. The product collected in the receiver is neutralized to a pH of 7.0 with aqueous sodium hydroxide solution. The viscosity of the product, which has a stability of four days at 145° F., is "E"–"F" (Gardner-Holdt).

Having described the invention, we claim:

1. A method of producing a urea-formaldehyde condensation product that comprises the steps of bringing urea, formaldehyde and water together to form an aqueous solution containing not less than 1.5 and not more than 2.5 mols of formaldehyde per mol of urea, adjusting the pH of the solution to a value between 6 and 8, subjecting the solution to superatmospheric pressure, heating the solution to a temperature above its boiling point at atmospheric pressure to thereby cause the pH to drop to a value at which condensation proceeds, and arresting the condensation at the desired point by cooling the solution.

2. A method as claimed in claim 1 wherein the solution is caused to flow continuously through a reaction zone in which it is under superatmospheric pressure.

3. A method as claimed in claim 2 wherein the solution is heated by injecting steam into the solution.

4. A method of producing a urea-formaldehyde condensation product that comprises the steps of bringing urea, formaldehyde and water together to form an aqueous solution having a pH between 6.5 and 7.5 and containing not less than 1.8 and not more than 2.2 mols of formaldehyde per mol of urea, causing the resulting solution to flow continuously through a reaction zone under a superatmospheric pressure sufficient to prevent vaporization of any ingredients thereof, injecting steam into the flowing stream of said solution to bring it to a temperature of 100 to 200° C. in said zone to thereby cause the pH of said solution to drop to a value at which condensation proceeds, the rate of flow, the pressure, and temperature of the solution obtaining in said reaction zone being adjusted to permit condensation to the desired point, and arresting the condensation at the latter point by cooling the solution.

5. A method as claimed in claim 4 wherein the stream of solution, in passing through the reaction zone, has the peripheral region thereof kept at a temperature lower than the main body thereof so as to prevent the condensation of the solution from proceeding to film formation in said region.

References Cited in the file of this patent

UNITED STATES PATENTS

| | | |
|---|---|---|
| 2,368,451 | D'Alelio | Jan. 30, 1945 |
| 2,428,752 | Hewett | Oct. 7, 1947 |
| 2,456,192 | Houlton | Dec. 14, 1948 |
| 2,467,212 | Kvalnes | Apr. 12, 1949 |
| 2,634,246 | Gronich | Apr. 7, 1953 |